(12) United States Patent
Barach et al.

(10) Patent No.: US 8,005,098 B2
(45) Date of Patent: Aug. 23, 2011

(54) LOAD BALANCING ACROSS MULTIPLE NETWORK ADDRESS TRANSLATION (NAT) INSTANCES AND/OR PROCESSORS

(75) Inventors: David Richard Barach, Boxborough, MA (US); Cullen Jennings, Santa Cruz, CA (US); David Delano Ward, Somerset, WI (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 12/205,848

(22) Filed: Sep. 5, 2008

(65) Prior Publication Data

US 2010/0061380 A1    Mar. 11, 2010

(51) Int. Cl.
*H04L 12/28* (2006.01)
(52) U.S. Cl. ............... 370/400; 370/395.31; 370/395.32
(58) Field of Classification Search .................. None
See application file for complete search history.

(56) References Cited

U.S. PATENT DOCUMENTS

| | | | |
|---|---|---|---|
| 5,495,426 A | 2/1996 | Waclawsky et al. | |
| 6,353,614 B1* | 3/2002 | Borella et al. | 370/389 |
| 6,438,133 B1 | 8/2002 | Ervin et al. | |
| 6,980,521 B1 | 12/2005 | Jarvis | |
| 7,103,039 B1 | 9/2006 | Rose | |
| 7,107,360 B1* | 9/2006 | Phadnis et al. | 709/250 |
| 7,111,162 B1 | 9/2006 | Bagepalli et al. | |
| 7,227,872 B1* | 6/2007 | Biswas et al. | 370/465 |
| 7,280,557 B1 | 10/2007 | Biswas et al. | |
| 7,328,237 B1 | 2/2008 | Thubert et al. | |
| 2002/0055971 A1* | 5/2002 | Shahrier | 709/203 |
| 2002/0129165 A1* | 9/2002 | Dingsor et al. | 709/246 |
| 2004/0028035 A1* | 2/2004 | Read | 370/352 |
| 2006/0062203 A1* | 3/2006 | Satapati | 370/352 |
| 2008/0031263 A1 | 2/2008 | Ervin et al. | |
| 2008/0117900 A1* | 5/2008 | Wang | 370/389 |

OTHER PUBLICATIONS

Larsen & Gont, "Port Randomization," draft-ietf-tsvwg-port-randomization-02, Internet Engineering Task Force, Aug. 31, 2008, 28 pages.
Comer, "Network Processors: Programmable Technology for Building Network Systems," The Internet Protocol Journal, Cisco Systems, Inc., Dec. 2004, vol. 7, No. 4, pp. 2-12.

* cited by examiner

*Primary Examiner* — Chi H Pham
*Assistant Examiner* — Kouroush Mohebbi
(74) *Attorney, Agent, or Firm* — The Law Office of Kirk D. Williams (57) ABSTRACT

Disclosed are, inter alia, methods, apparatus, computer-storage media, mechanisms, and means associated with load balancing across multiple network address translation (NAT) instances and/or processors. N network address translation (NAT) processors and/or instances are each assigned a portion of the source address traffic in order to load balance the network address translation among them. Additionally, the address space of translated addresses is partitioned and uniquely assigned to the NAT processors and/or instances such that the identification of the assigned NAT processor and/or instance associated with a received translated address can be readily determined there from, and then used to network address translate that received packet.

29 Claims, 7 Drawing Sheets

LOAD BALANCING ACROSS MULTIPLE NETWORK ADDRESS TRANSLATION (NAT) INSTANCES AND/OR PROCESSORS

TECHNICAL FIELD

The present disclosure relates generally to communications and computer systems, especially routers, packet switching systems, and other network devices.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. A common network architecture used for a private network to access the Internet is to use a router with standalone or built-in network address translation (NAT) functionality to translate between internal network addresses and shared network addresses.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DESCRIPTION OF EXAMPLE EMBODIMENTS

1. Overview

Disclosed are, inter alia, methods, apparatus, computer-storage media, mechanisms, and means associated with load balancing across multiple network address translation (NAT) instances and/or processors. One embodiment includes an apparatus, comprising: one or more network interfaces configured for receiving and sending packets; n network address translation (NAT) processors; and one or more distributors, with n being an integer greater than one. The n NAT processors are configured to perform network address translations independently of each other; with each of the n NAT processors being assigned a predetermined, non-overlapping space of translated source addresses used by the n NAT processors. Each of the n NAT processors is configured to: translate non-translated packets to use source addresses from its said assigned space of translated source addresses, and to translate received translated packets with destination addresses in its said assigned space of translated source addresses. The distributor(s) are configured for distributing packets of streams of received non-NAT-translated packets and received NAT-translated packets to the n NAT processors for performing said network address translation, with all packets of each particular stream of said received non-translated packets being distributed to the same NAT processor of the n NAT processors according to a predetermined mapping of each source of said received non-translated packets uniquely to one of the n NAT processors. Additionally, received NAT-translated packets are distributed to a NAT processor of the n NAT processors according to said assigned spaces of translated source addresses; and wherein corresponding streams of said received non-NAT-translated packets and received NAT-translated packets are distributed to the same NAT processor of the n NAT processors.

2. Description

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations. Note, computer-readable media and means for performing methods and processing block operations are disclosed and are in keeping with the extensible scope and spirit of the invention. Moreover, nothing described or referenced in this document is admitted as prior art to this application unless explicitly so stated.

The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation).

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps.

Disclosed are, inter alia, methods, apparatus, computer-storage media, mechanisms, and means associated with load balancing across multiple network address translation (NAT) instances and/or processors. One embodiment includes an apparatus, comprising: one or more network interfaces configured for receiving and sending packets; n network address translation (NAT) processors configured to perform network address translations independently of each other; with each of said n NAT processors being assigned a predetermined, non-overlapping space of translated source addresses used by said n NAT processors; with each of said n NAT processors being configured to: translate non-translated packets to use source addresses from its said assigned space of translated source addresses, and to translate received translated packets with destination addresses in its said assigned space of translated source addresses; and with n being an integer greater than one; and one or more distributors configured for distributing packets of streams of received non-NAT-translated packets and received NAT-translated packets to said n NAT processors for performing said network address translation, wherein all packets of each particular stream of said received non-translated packets are distributed to the same NAT processor of said n NAT processors according to a predetermined mapping of each source of said received non-translated packets uniquely to one of said n NAT processors; and wherein received NAT-translated packets are distributed to a NAT processor of said n NAT processors according to said assigned spaces of translated source addresses; and wherein corresponding streams of said received non-NAT-translated packets and received NAT-translated packets are distributed to the same NAT processor of said n NAT processors.

In one embodiment, each of said n assigned spaces of translated source addresses is approximately equal in size. In one embodiment, said translated source addresses includes a plurality of Internet Protocol (IP) addresses, and where each of said n assigned spaces of translated source addresses includes a plurality of port numbers for each IP address of the plurality of IP addresses. In one embodiment, said translation from a non-translated to a translated packet by a particular NAT processor of said n NAT processors includes randomly selecting a particular translated source address from currently available translated source addresses of the plurality of said translated source addresses assigned to the particular NAT processor. In one embodiment, said randomly selecting includes using a cryptographic-quality random number in performing said random selection. In one embodiment, the space of said sources of said received non-translated packets is approximately equally partitioned among said n NAT processors. In one embodiment, each of said sources of said received non-translated packets is identified by an IP address. In one embodiment, each of said sources of said received non-translated packets is identified by a router identification and an IP address. In one embodiment, n is at least sixty-four. In one embodiment, each of said n NAT processors is running a plurality of NAT instances, with its said network address translation operations being distributed among its said plurality of NAT instances. In one embodiment, each of said n NAT processors is configured to translate received translated packets only having source addresses in its said assigned space of translated source addresses. In one embodiment, wherein said translation of non-translated packets that are Internet Control Message Protocol (ICMP) packets includes inserting a port number in the Information Field of the translated packet so that corresponding received NAT-translated echo response packets will include said inserted port number for use in appropriately distributing said received NAT-translated echo response packets to said n NAT processors.

One embodiment performs a method, comprising: network address translating, by an apparatus, a source address of a plurality of packets of a plurality of streams of packets by their respective assigned network address translation (NAT) instance of n NAT instances, with n being greater than one, wherein a stream corresponding to a particular packet is identified by a particular source address of the particular packet; and wherein the address space of said source addresses of the plurality of streams of packets is approximately evenly partitioned into n portions with each portion being assigned to a single different one of said n NAT instances; and wherein said network address translating includes selecting a new translated source address for each identifiable packet of the plurality of packets and forwarding a translated packet, representing said identifiable packet, including the new translated source address as the source address of the translated packet; wherein the space of said translated source addresses to use is partitioned approximately equally among said n NAT instances, and such that each said translated source address, when used in identifying a source of a received translated packet received by the apparatus, readily maps to a particular NAT instance of said n NAT instances that was used to said translate the corresponding said source address into said translated source address.

In one embodiment, the address space of said source addresses of the plurality of streams of packets refers to all possible addresses. In one embodiment, the address space of said source addresses of the plurality of streams of packets refers to all currently assigned addresses for use by network devices. In one embodiment, the new translated source address includes an IP address and a port number. In one embodiment, for Internet Control Message Protocol (ICMP) packets, the port number is included in the Information Field of the translated packet. One embodiment includes: receiving, by the apparatus, a particular packet including a particular translated source address as its destination address; and identifying, from said particular translated source address, the NAT instance of said n NAT instances that said translated an original source address of an original packet into said particular translated source address; translating said particular packet by said identified NAT instance into a new packet including as its destination address the original source address; and forwarding the new packet from the apparatus. In one embodiment, said selecting a new translated source address includes randomly selecting the new translated source address from currently available translated source addresses assigned to the particular NAT instance. In one embodiment, said randomly selecting includes using a cryptographic-quality random number in performing said random selection.

One embodiment includes an apparatus comprising: means for sending and receiving packets; n means for performing network address translation (NAT) configured to perform network address translations independently of each other; with each of said n means for performing NAT being assigned a predetermined, non-overlapping space of translated source addresses used by said n means for performing NAT; with each of said n means for performing NAT being configured to: translate non-translated packets to use source addresses from its said assigned space of translated source addresses, and to translate received translated packets with destination addresses in its said assigned space of translated source addresses; and with n being an integer greater than one; and means for distributing packets of streams of received non-NAT-translated packets and received NAT-translated packets to said n means for performing NAT, wherein all packets of each particular stream of said received non-translated packets are distributed to the same means for performing NAT of said n means for performing NAT according to a predetermined mapping of each source of said received non-translated packets uniquely to one of said n means for performing NAT; and wherein received NAT-translated packets are distributed to a means for performing NAT of said n means for performing NAT according to said assigned spaces of translated source addresses; and wherein corresponding streams of said received non-NAT-translated packets and received NAT-translated packets are distributed to the same means for performing NAT of said n means for performing NAT.

In one embodiment, said translated source addresses includes a plurality of Internet Protocol (IP) addresses, and where each of said n assigned spaces of translated source addresses includes a plurality of port numbers for each IP address of the plurality of IP addresses.

Figure 1A:
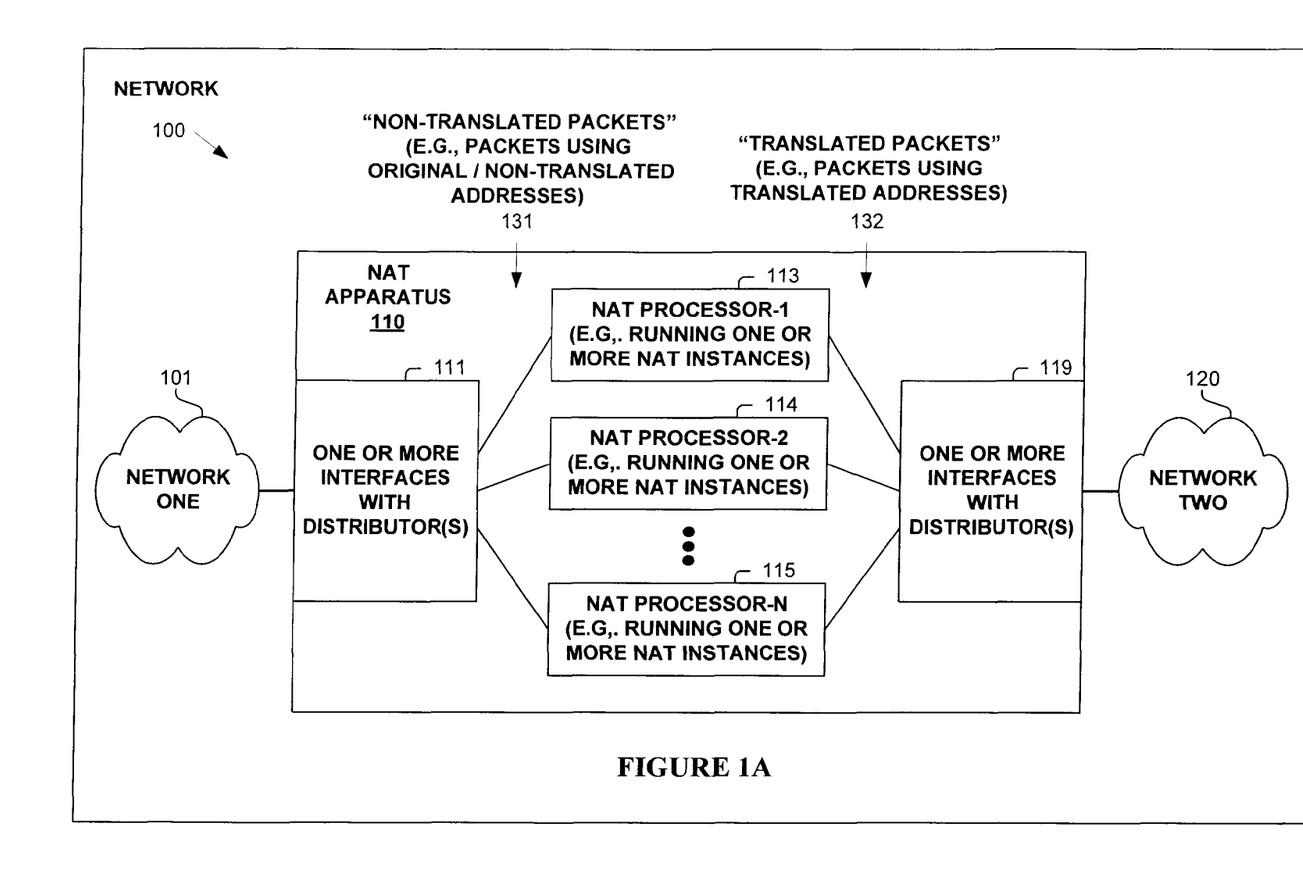
FIG. 1A illustrates a network operating according to one embodiment.

Expressly turning to the figures, FIG. 1A illustrates an example network 100 operating according to one or more embodiments. Shown are two network 101 and 120 with a NAT apparatus 110 interposed in between. NAT apparatus 110 includes one or more interfaces 111, 119 including distributor(s) configured for sending and receiving packets and distributing packets to n NAT processors/instances 113-115 for performing address translation for sending packets through networks 101 and 120. In one embodiment, a distributor is a bus, switching fabric, or other mechanism to communicate a packet between an interface and a NAT processor/instance 113-115.

Note, the term "NAT processor" is used herein to refer to a processing device for performing NAT translation; and the term "NAT instance" refers to a process, thread, native code, or the like running on a NAT processor which is configured for performing network address translation. As shown in FIG. 1A and used herein, the term "non-translated packets" (131) refers to packets that use original, non-translated addresses, whether they are inbound or outbound from the NAT apparatus 110; and the term "translated packets" (132) refers to packets using translated addresses, whether they are inbound or outbound from the NAT apparatus 110. The operation of one embodiment will be further described herein.

Figure 1B:
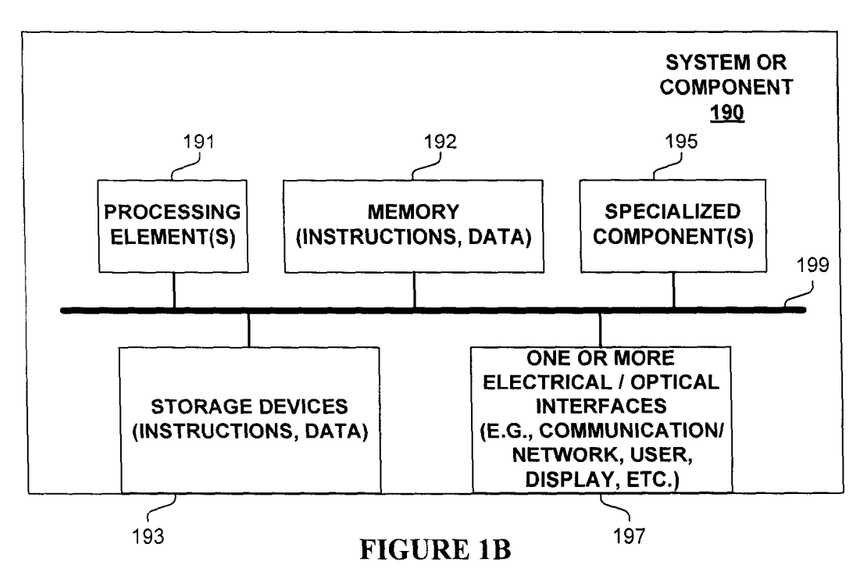
FIG. 1B illustrates an example system or component used in one embodiment.

FIG. 1B illustrates a block diagram of a system or component 190 used in one embodiment associated with load balancing across multiple network address translation (NAT) instances and/or processors. In one embodiment, system or component 190 performs one or more processes corresponding to one of the flow diagrams illustrated or otherwise described herein. In one embodiment, a system or component 190 is use in a network address translation appliance or packet switching system for use in performing network address translation.

In one embodiment, system or component 190 includes one or more processing elements 191, memory 192, storage devices 193, specialized components 195 (e.g. optimized hardware such as for performing operations, etc.), and interface(s) 197 for communicating information (e.g., communicating information over electrical and/or optical networks, user-interfaces, displaying information, etc.), which are typically communicatively coupled via one or more communications mechanisms 199, with the communications paths typically tailored to meet the needs of the application.

Various embodiments of component 190 may include more or less elements. The operation of component 190 is typically controlled by processing element(s) 191 using memory 192 and storage devices 193 to perform one or more tasks or processes. Memory 192 is one type of computer-readable/computer-storage medium, and typically comprises random access memory (RAM), read only memory (ROM), flash memory, integrated circuits, and/or other memory components. Memory 192 typically stores computer-executable instructions to be executed by processing element(s) 191 and/or data which is manipulated by processing element(s) 191 for implementing functionality in accordance with an embodiment. Storage devices 193 are another type of computer-readable medium, and typically comprise solid state storage media, disk drives, diskettes, networked services, tape drives, and other storage devices. Storage devices 193 typically store computer-executable instructions to be executed by processing element(s) 191 and/or data which is manipulated by processing element(s) 191 for implementing functionality in accordance with an embodiment.

Figure 2A:
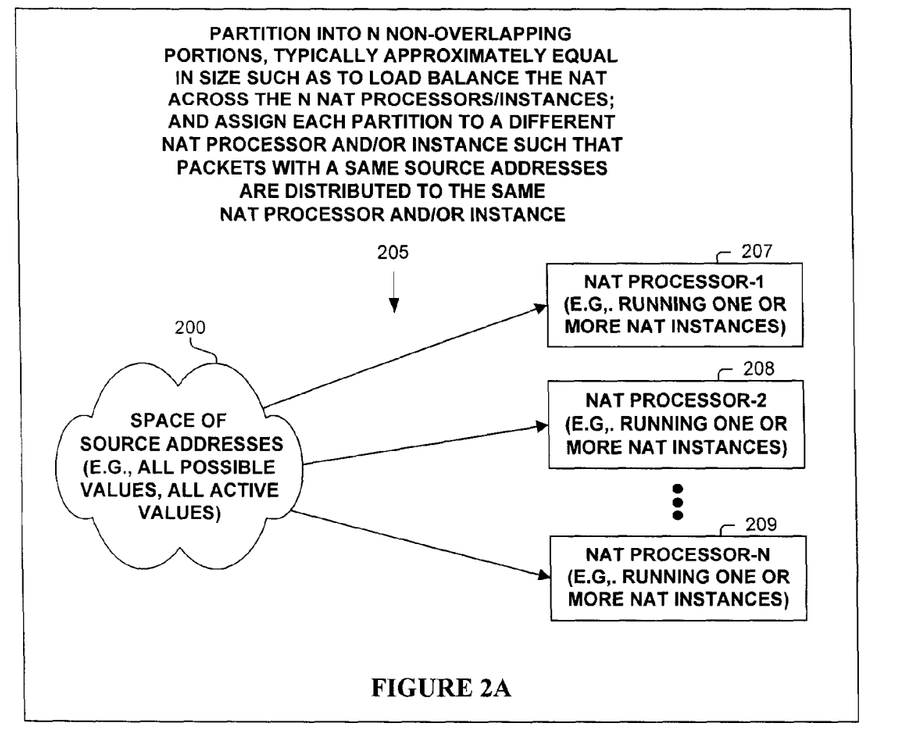
FIG. 2A illustrates a load balancing approach used in one embodiment.

FIG. 2A illustrates one aspect, of one embodiment, pertaining to how to distribute non-translated packets to the n NAT processors/instances 207-209. As illustrated, the space of possible source addresses 200 (e.g., all possible values, all active/in-use values, all assigned values) is partitioned into n non-overlapping portions, with each being assigned (205) (and corresponding packets distributed thereto) to one of the n NAT processors/instances 207-209. Therefore, each packet with a same original source address (hence all packets in a same stream of packets) is deterministically distributed to the same one of the n NAT processors/instances 207-209.

Typically, the space of source addresses 200 is divided into approximately equal portions, or in another manner (e.g., based on traffic patterns for particular addresses) so as to load balance the network address translation among the n NAT processors/instances 207-209. In one embodiment, the space of addresses 200 is divided approximately equally. In one embodiment, the corresponding one of the n NAT processors/instances is identified by the source IP address (possibly hashed and/or convoluted with another value) mod n. In one embodiment, the corresponding one of the n NAT processors/instances is identified by a hashing or other convolution of the source IP address and an identification of the packet switching device (possibly a virtual router and forwarding device) (e.g., a value assigned to represent the packet switching device, a value representing an interface on which the packet was received) mod n. Note, one embodiment includes an identification of the packet switching device in this determination as multiple packet switching devices may use the same actual address (e.g., multiple networks each use the address 10.0.0.1); and in this manner, same IP addresses coming from different routers/networks can be load balanced to different ones of the n NAT processors/instances 207-209.

Note, the phrase "approximately equal", especially referring to the partitioning of an original or translated address space, is used to refer to values which are substantially the same, e.g., within the same order of magnitude, within twenty-five percent, within several powers of two—especially for large sized portions of network addresses, etc. For example, one embodiment uses eight NAT processors/instances, and divides the IPv4 32-bit address space into eight equal portions of $2^{29}$ addresses each. However, certain addresses may not be available for use as IP addresses (e.g., based on the IP address specifications), so the exact size of these portions may vary. Additionally, one embodiment allocates the address space based on the number of assigned addresses and/or traffic usage of addresses, rather than their possible range of values, so one portion with $2^{25}$ possible addresses with only $2^{10}$ would be approximately equal in size, in one embodiment, to a portion with has $2^{12}$ possible addresses with around $2^{10}$ being used.

Figure 2B:
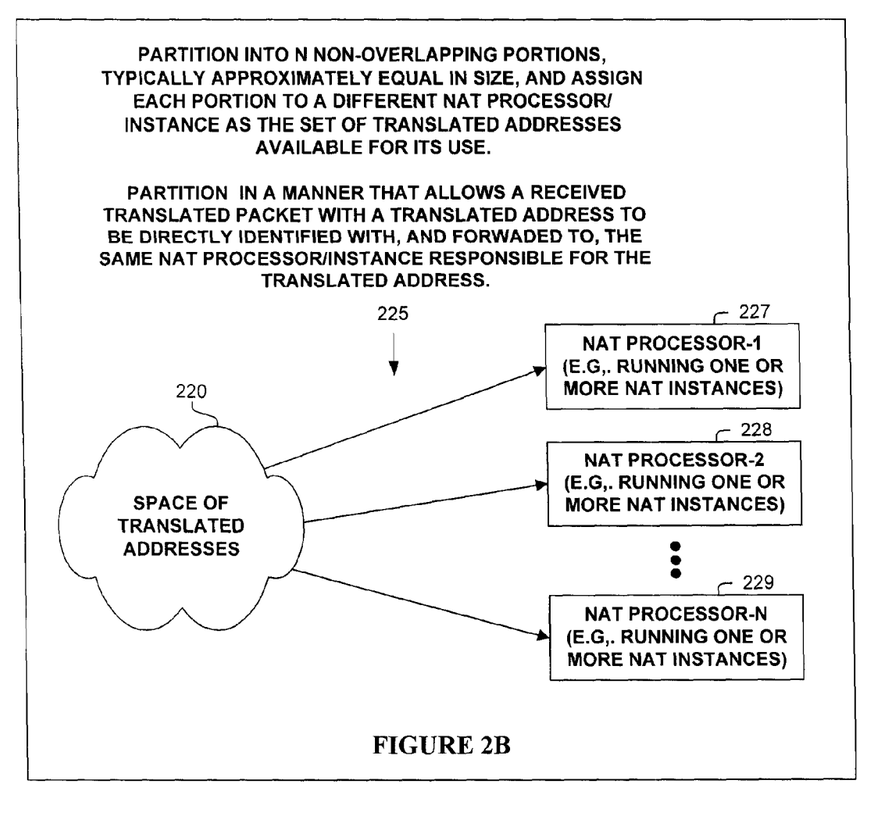
FIG. 2B illustrates an allocation of translated addresses used in one embodiment.

FIG. 2B illustrates one aspect, of one embodiment, pertaining to how to distribute translated address to, and for use by, the n NAT processors/instances 207-209. As illustrated, the space of translated addresses 220 is partitioned (225) into n non-overlapping portions, and accordingly allocated to n NAT processors/instances 227-229. Typically, each of these portions is approximately equal in size. Additionally, typically a direct calculation, or simple lookup operation, using each of the translated addresses in a portion can be performed to readily identify the one of n NAT processors/instances 227-229 to which it is assigned. In this manner, a received packet with a translated address can be used to readily determine the one of n NAT processors/instances 227-229 to perform the network address translation thereon; with this being the same NAT processor/instance (227-229) that performed the original packet network address translation to a translated packet including the same translated address.

One embodiment allocates an approximately equal portion of the available translated address space to each of the n NAT processors/instances 227-229. In one embodiment, each of the n NAT processors/instances 227-229 is allocated an approximately equal number of ports, and same values of ports, for each IP address, which allows the determination of the NAT processor/instance (227-229) to use based on a direct calculation, or simple lookup operation, on the port number of the destination address of the received translated packet. Note, in one embodiment, for Internet Control Message Protocol (ICMP) packets which do not use port numbers, the port number of the translated address is inserted in the Information Field, and returned to the NAT device such as in an echo reply packet. In one embodiment, each of n NAT processors/instances 227-229 is assigned different IP addresses such that no two of the n NAT processors/instances 227-229 are assigned a same IP address. This approach allows a direct determination of which of n NAT processors/instances 227-229 a received translated packet corresponds simply based on its translated IP address (e.g., typically the destination address of the packet). Additionally, in one embodiment, in performing the selection of a translated address to use for a packet flow, a NAT processor/instance (227-229) will choose this translated network address (e.g., an IP address and/or port number) randomly, possibly cryptographically randomly (i.e., truly random such as based on using some random characteristic of the NAT device as a seed for generating a random number) from the set of currently available translated network addresses for its use.

Figure 3:
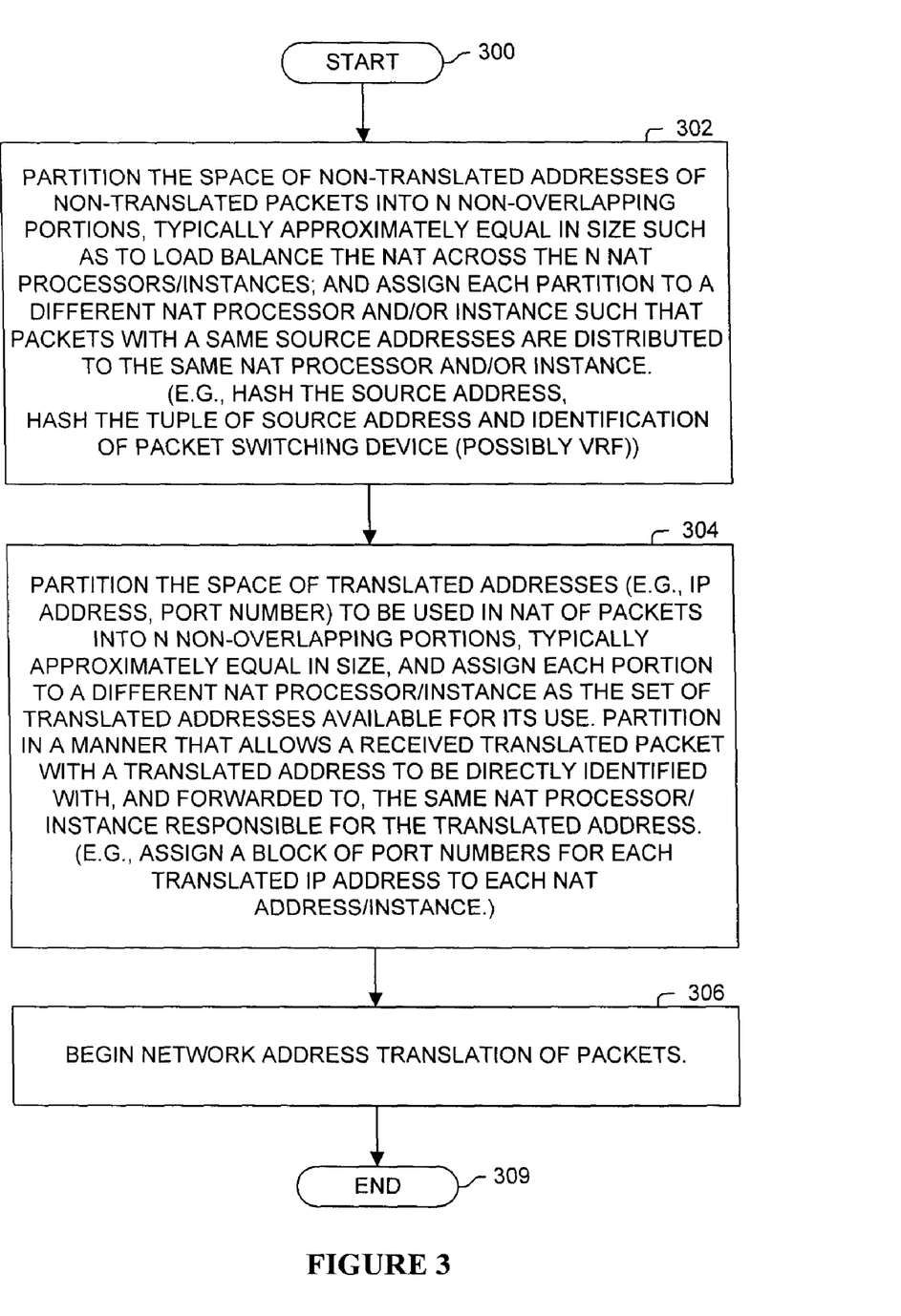
FIG. 3 illustrates a process performed in one embodiment.

FIG. 3 illustrates a processed used in one embodiment to assign received source addresses to the n NAT processors/instances (process block 302) and to assign translated addresses to the n NAT processors/instances (process block 304) prior to performing network address translation (process block 306). By providing each of the n NAT processors/instances its own unique set of translated addresses to use and by deterministically assigning packets to a NAT processor/instance, one embodiment provides that each of the n NAT processors/instances can operate independently of each other with no required updating of common data structures and performing locking operations thereon. This approach reduces complexity of implementation and provides better scalability than a system with multiple NAT processors which must share information and in which packets of a same stream can be translated by different NAT processors. One embodiment using at least sixty-four NAT processors/instances is envisioned to be used by a network carrier to perform network address translation of 200,000 hosts and 20,000,000 discrete packet flows.

Processing of the flow diagram of FIG. 3 begins with process block 300. In process block 302, the space of non-translated addresses of non-translated packets is partitioned into n non-overlapping portions, typically approximately equal in size such as to load balance the network address translation across the n NAT processors/instances. Each partition is assigned to a different NAT processor and/or instance such that packets with a same source addresses are distributed to the same NAT processor and/or instance (e.g., by hashing the source address, hashing based on the tuple of source address and identification of packet switching device, etc.). In process block 304, the space of translated addresses (e.g., IP address, port number) to be used in network address translation of packets is partitioned into n non-overlapping portions, typically approximately equal in size. Each portion is assigned to a different NAT processor/instance as the set of translated addresses available for its use. This partitioning is performed in a manner that allows a received translated packet with a translated address to be directly identified with, and forwarded to, the same NAT processor/instance responsible for the translated address. In process block 306, after the initialization performed in process blocks 302 and 304, the network address translation using the n NAT processors/instances is performed. Processing of the flow diagram of FIG. 3 is complete as indicated by process block 309.

Figure 4A:
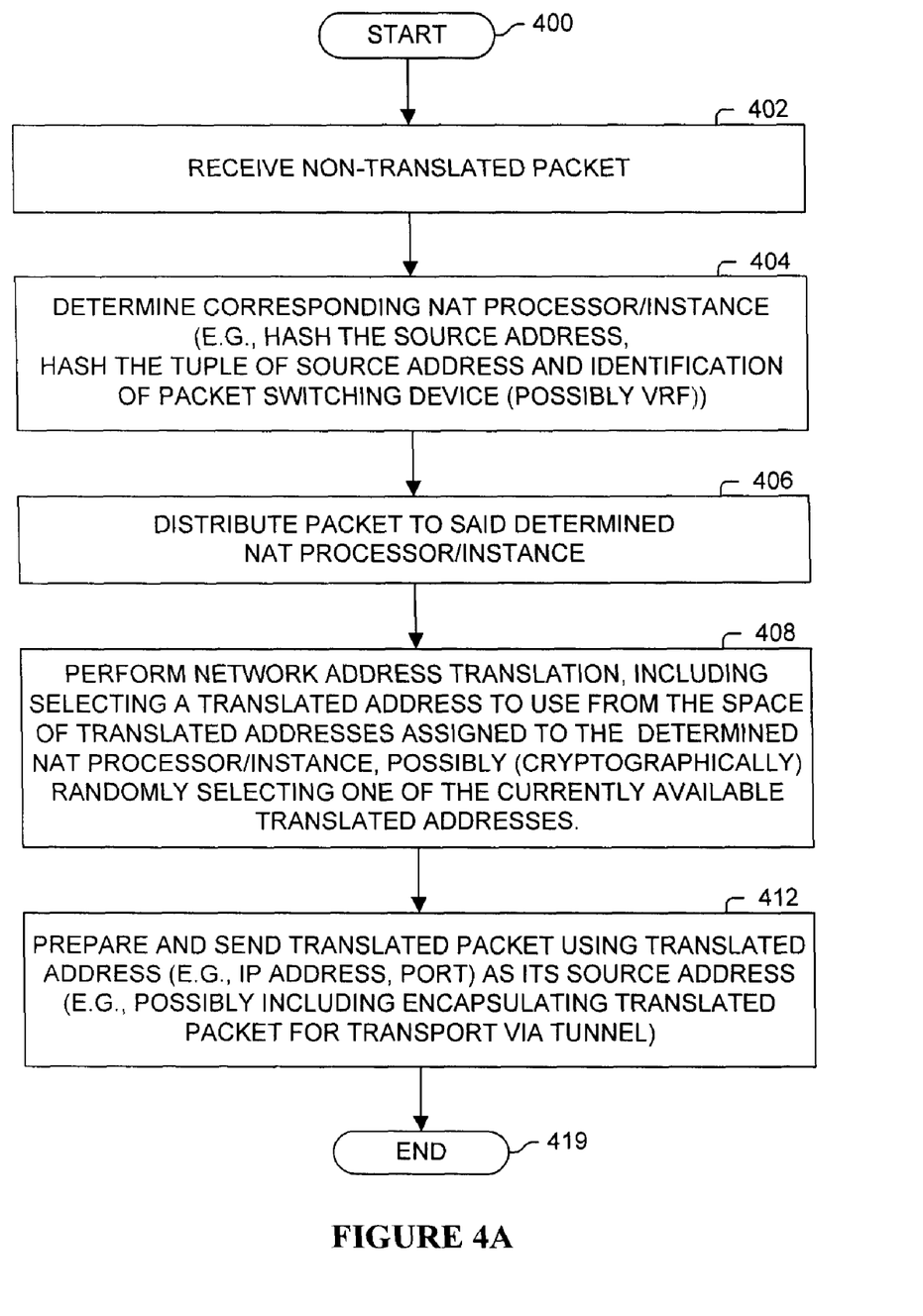
FIG. 4A illustrates a process performed in one embodiment.

FIG. 4A illustrates a process used in one embodiment for network address translating of a non-translated packet with an original source address into a translated packet with a translated source address. Processing begins with process block 400. In process block 402, the non-translated packet is received. In process block 404, the corresponding NAT processor/instance is readily determined (e.g., based on the source IP address, and possibly with an identification of its packet switching/network source). In process block 406, the packet is distributed to the NAT processor/instance determined in process block 404. In process block 408, the network address translation of the packet is performed, which includes selecting a translated address to use from the space of translated addresses allocated to the particular NAT processor/instance. In one embodiment, this operation includes randomly, possibly cryptographic randomly, selecting the translated address from the currently available translated addresses. This random selection provides a level of security as an external device cannot perceive, based on past usage of port numbers (or IP addresses and port numbers), the next translated address which is going to be used. In process block 410, the translated packet, with the translated address (e.g., IP address, port) is prepared and sent. In one embodiment, this includes encapsulating the translated packet for transport via a tunnel (e.g., using GRE, L2TPv2, MPLS, L2 softwires, etc.). Processing of the flow diagram of FIG. 4A is complete as indicated by process block 419.

Figure 4B:
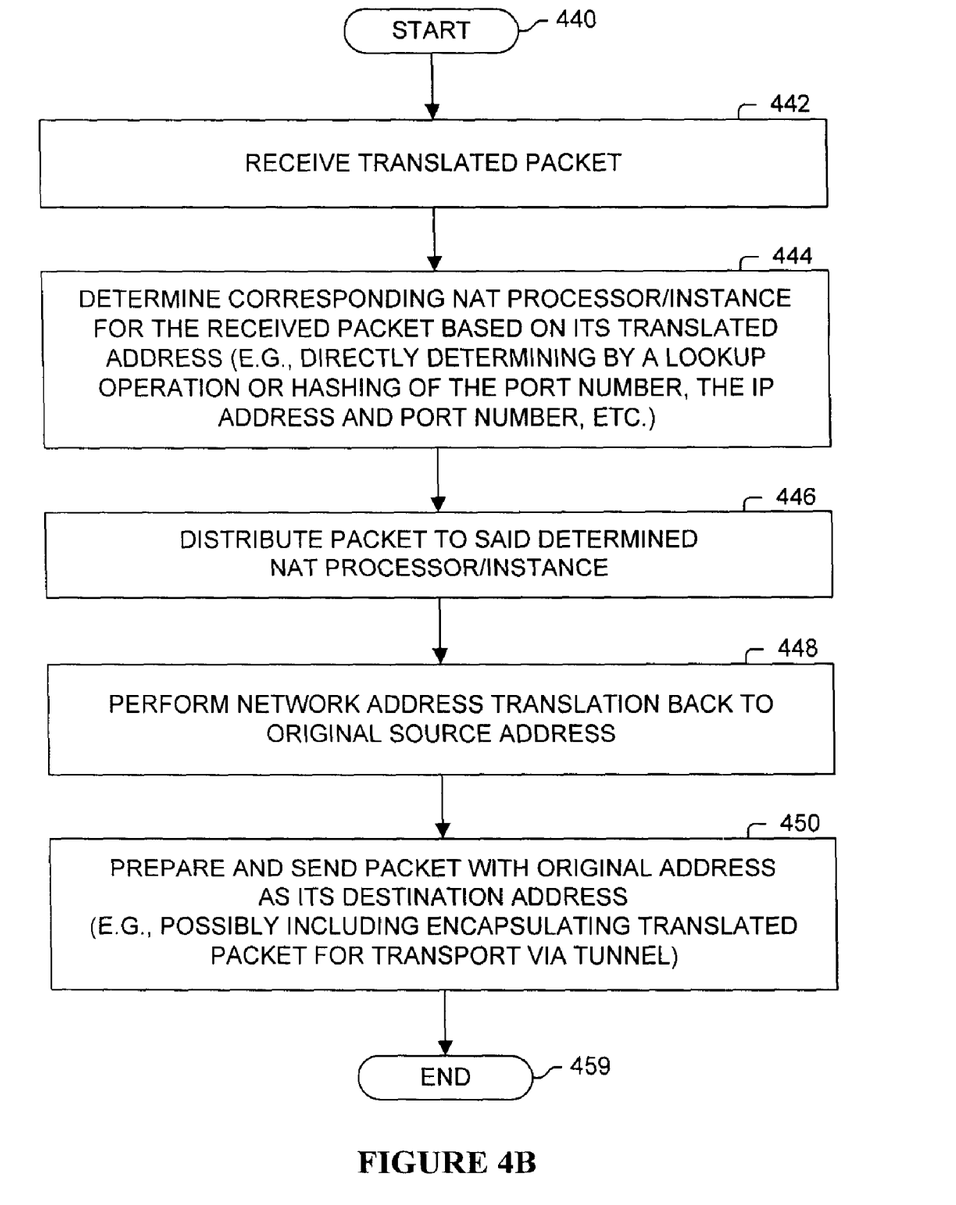
FIG. 4B illustrates a process performed in one embodiment.

FIG. 4B illustrates a process used in one embodiment for network address translating of a received translated packet (e.g., a packet having a translated address as its destination address). Processing beings with process block 400. In process block 442, the translated packet is received. In process block 444, the NAT processor/instance to use is readily determined based on the received translated address, such as but not limited to, a calculation of the port number mod n, or another calculation or lookup operation on the received translated address (i.e., on the entire address or a portion thereof). In one embodiment, for an ICMP packet, the port number of the translated address is received in the Identifier Field of the packet. Next, in process block 446, the received packet is distributed to the determined NAT processor/instance. In process block 448, the network address translation is performed. In process block 450, the translated packet, with the original address as the destination address, is prepared and sent. In one embodiment, this includes encapsulating the translated packet for transport via a tunnel (e.g., using GRE, L2TPv2, MPLS, L2 softwires, etc.). Processing of the flow diagram of FIG. 4B is complete as indicated by process block 459.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. An appliance, comprising:
   one or more network interfaces, within the appliance, configured for receiving and sending packets;
   n network address translation (NAT) processors, within the appliance, configured to perform network address translations independently of each other; with each of said n NAT processors being assigned a predetermined, non-overlapping space of translated source addresses used by said n NAT processors; with each of said n NAT processors being configured to: translate non-translated packets to use source addresses from its said assigned space of translated source addresses, and to translate received translated packets with destination addresses in its said assigned space of translated source addresses; and with n being an integer greater than one; and
   one or more distributors, within the appliance, configured for distributing packets of streams of received non-NAT-translated packets and received NAT-translated packets to each of said n NAT processors for performing said network address translation, wherein all packets of each particular stream of said received non-translated packets are distributed to the same NAT processor of said n NAT processors according to a predetermined mapping, within the apparatus, of each source of said received non-translated packets uniquely to one of said n NAT processors; and wherein received NAT-translated packets are distributed to a NAT processor of said n NAT processors according to said assigned spaces of translated source addresses; and wherein corresponding streams of said received non-NAT-translated packets and received NAT-translated packets are distributed to the same NAT processor of said n NAT processors.

2. The appliance of claim 1, wherein each of said n assigned spaces of translated source addresses is approximately equal in size.

3. The appliance of claim 2, wherein said translated source addresses includes a plurality of Internet Protocol (IP) addresses, and where each of said n assigned spaces of translated source addresses includes a plurality of port numbers for each IP address of the plurality of IP addresses.

4. The appliance of claim 3, wherein said translation from a non-translated to a translated packet by a particular NAT processor of said n NAT processors includes randomly selecting a particular translated source address from currently available translated source addresses of the plurality of said translated source addresses assigned to the particular NAT processor.

5. The appliance of claim 4, wherein said randomly selecting includes using a cryptographic-quality random number in performing said random selection.

6. The appliance of claim 4, wherein the space of said sources of said received non-translated packets is approximately equally partitioned among said n NAT processors.

7. The appliance of claim 2, wherein the space of said sources of said received non-translated packets is approximately equally partitioned among said n NAT processors.

8. The appliance of claim 1, wherein the space of said sources of said received non-translated packets is approximately equally partitioned among said n NAT processors.

9. The appliance of claim 8, wherein each of said sources of said received non-translated packets is identified by an IP address.

10. The appliance of claim 1, wherein each of said sources of said received non-translated packets is identified by an IP address.

11. The appliance of claim 1, wherein each of said sources of said received non-translated packets is identified by a router identification and an IP address.

12. The appliance of claim 1, wherein n is at least sixty-four.

13. The appliance of claim 1, wherein each of said n NAT processors is running a plurality of NAT instances, with its said network address translation operations being distributed among its said plurality of NAT instances.

14. The appliance of claim 1, wherein each of said n NAT processors is configured to translate received translated packets only having source addresses in its said assigned space of translated source addresses.

15. The apparatus of claim 1, wherein said one or more distributors includes:
   a first distributor configured for said distributing packets of streams of received non-NAT-translated packets to each of said n NAT processors; and
   a second distributor configured for said distributing packets of streams of received NAT-translated packets to each of said n NAT processors.

16. An apparatus, comprising:
   one or more network interfaces configured for receiving and sending packets;
   n network address translation (NAT) processors configured to perforin network address translations independently of each other; with each of said n NAT processors being assigned a predetermined, non-overlapping space of translated source addresses used by said n NAT processors; with each of said n NAT processors being configured to: translate non-translated packets to use source addresses from its said assigned space of translated source addresses, and to translate received translated packets with destination addresses in its said assigned space of translated source addresses; and with n being an integer greater than one; and
   one or more distributors configured for distributing packets of streams of received non-NAT-translated packets and received NAT-translated packets to said n NAT processors for performing said network address translation, wherein all packets of each particular stream of said received non-translated packets are distributed to the same NAT processor of said n NAT processors according to a predetermined mapping of each source of said received non-translated packets uniquely to one of said n NAT processors; and wherein received NAT-translated packets are distributed to a NAT processor of said n NAT processors according to said assigned spaces of translated source addresses; and wherein corresponding streams of said received non-NAT-translated packets and received NAT-translated packets are distributed to the same NAT processor of said n NAT processors;

wherein said translation of non-translated packets that are Internet Control Message Protocol (ICMP) packets includes inserting a port number in the Information Field of the translated packet so that corresponding received NAT-translated echo response packets will include said inserted port number for use in appropriately distributing said received NAT-translated echo response packets to said n NAT processors.

17. The apparatus of claim 16, wherein the apparatus is an appliance.

18. A method, comprising: network address translating, by an appliance including one or more distributors, a source address of a plurality of packets of a plurality of streams of packets by their respective assigned network address translation (NAT) instance of n NAT instances, with n being greater than one, wherein a stream corresponding to a particular packet is identified by a particular source address of the particular packet; and wherein the address space of said source addresses of the plurality of streams of packets is approximately evenly partitioned into n portions with each portion being assigned and distributed within the appliance to a single different one of said n NAT instances; and wherein said network address translating includes selecting a new translated source address for each identifiable packet of the plurality of packets and forwarding a translated packet, representing said identifiable packet, including the new translated source address as the source address of the translated packet; wherein the space of said translated source addresses to use is partitioned approximately equally among said n NAT instances, and such that each said translated source address, when used in identifying a source of a received translated packet received by the appliance, readily maps, within the appliance, to a particular NAT instance of said n NAT instances that was used to said translate the corresponding said source address into said translated source address; wherein said one or more distributors are configured for distributing received packets to each of said n NAT instances according their said respective assignment to the single different one of said n NAT instances.

19. The method of claim 18, wherein the address space of said source addresses of the plurality of streams of packets refers to all possible addresses.

20. The method of claim 18, wherein the address space of said source addresses of the plurality of streams of packets refers to all currently assigned addresses for use by network devices.

21. The method of claim 18, wherein the new translated source address includes an IP address and a port number.

22. The method of claim 18, including receiving, by the appliance, a particular packet including a particular translated source address as its destination address; and identifying, from said particular translated source address, the NAT instance of said n NAT instances that said translated an original source address of an original packet into said particular translated source address; translating said particular packet by said identified NAT instance into a new packet including as its destination address the original source address; and forwarding the new packet from the appliance.

23. The method of claim 18, wherein said selecting a new translated source address includes randomly selecting the new translated source address from currently available translated source addresses assigned to the particular NAT instance.

24. A method, comprising: network address translating, by an apparatus, a source address of a plurality of packets of a plurality of streams of packets by their respective assigned network address translation (NAT) instance of n NAT instances, with n being greater than one, wherein a stream corresponding to a particular packet is identified by a particular source address of the particular packet; and wherein the address space of said source addresses of the plurality of streams of packets is approximately evenly partitioned into n portions with each portion being assigned to a single different one of said n NAT instances; and wherein said network address translating includes selecting a new translated source address for each identifiable packet of the plurality of packets and forwarding a translated packet, representing said identifiable packet, including the new translated source address as the source address of the translated packet; wherein the space of said translated source addresses to use is partitioned approximately equally among said n NAT instances, and such that each said translated source address, when used in identifying a source of a received translated packet received by the apparatus, readily maps to a particular NAT instance of said n NAT instances that was used to said translate the corresponding said source address into said translated source address;

wherein the new translated source address includes an IP address and a port number; and wherein for Internet Control Message Protocol (ICMP) packets, the port number is included in the Information Field of the translated packet.

25. The method of claim 24, wherein the apparatus is an appliance.

26. A method, comprising: network address translating, by an apparatus, a source address of a plurality of packets of a plurality of streams of packets by their respective assigned network address translation (NAT) instance of n NAT instances, with n being greater than one, wherein a stream corresponding to a particular packet is identified by a particular source address of the particular packet; and wherein the address space of said source addresses of the plurality of streams of packets is approximately evenly partitioned into n portions with each portion being assigned to a single different one of said n NAT instances; and wherein said network address translating includes selecting a new translated source address for each identifiable packet of the plurality of packets and forwarding a translated packet, representing said identifiable packet, including the new translated source address as the source address of the translated packet; wherein the space of said translated source addresses to use is partitioned approximately equally among said n NAT instances, and such that each said translated source address, when used in identifying a source of a received translated packet received by the apparatus, readily maps to a particular NAT instance of said n NAT instances that was used to said translate the corresponding said source address into said translated source address;

wherein said selecting a new translated source address includes randomly selecting the new translated source address from currently available translated source addresses assigned to the particular NAT instance; and wherein said randomly selecting includes using a cryptographic-quality random number in performing said random selection.

27. The method of claim 26, wherein the apparatus is an appliance.

28. An appliance, comprising:

means for sending and receiving packets;

n means for performing network address translation (NAT) configured to perform network address translations independently of each other; with each of said n means for performing NAT being assigned a predetermined, non-overlapping space of translated source addresses used by said n means for performing NAT; with each of said n means for performing NAT being configured to: translate non-translated packets to use source addresses from its said assigned space of translated source addresses, and to translate received translated packets with destination addresses in its said assigned space of translated source addresses; and with n being an integer greater than one; and one or more distributors configured for distributing packets of streams of received non-NAT-translated packets and received NAT-translated packets to each of said n means for performing NAT, wherein all packets of each particular stream of said received non-translated packets are distributed to the same means for performing NAT of said n means for performing NAT according to a predetermined mapping, within the apparatus, of each source of said received non-translated packets uniquely to one of said n means for performing NAT; and wherein received NAT-translated packets are distributed to a means for performing NAT of said n means for performing NAT according to said assigned spaces of translated source addresses; and wherein corresponding streams of said received non-NAT-translated packets and received NAT-translated packets are distributed to the same means for performing NAT of said n means for performing NAT; wherein a first distributor of said one or more distributors is configured for distributing received translated packets to each of said n means for performing NAT according their said respective predetermined, non-overlapping space of translated source addresses.

29. The appliance of claim 28, wherein said translated source addresses includes a plurality of Internet Protocol (IP) addresses, and where each of said n assigned spaces of translated source addresses includes a plurality of port numbers for each IP address of the plurality of IP addresses.

* * * * *

UNITED STATES PATENT AND TRADEMARK OFFICE
CERTIFICATE OF CORRECTION

| | | |
|---|---|---|
| PATENT NO. | : 8,005,098 B2 | Page 1 of 1 |
| APPLICATION NO. | : 12/205848 | |
| DATED | : August 23, 2011 | |
| INVENTOR(S) | : Barach et al. | |

It is certified that error appears in the above-identified patent and that said Letters Patent is hereby corrected as shown below:

Col. 10, line 54, replace "perforin" with -- perform --

Signed and Sealed this
Twentieth Day of December, 2011

David J. Kappos
*Director of the United States Patent and Trademark Office*